US012646483B2

(12) United States Patent
Lee et al.

(10) Patent No.: US 12,646,483 B2
(45) Date of Patent: Jun. 2, 2026

(54) APPLICATION PROCESSOR, ELECTRONIC DEVICE HAVING THE SAME, AND METHOD OF OPERATING THE SAME

(71) Applicant: SAMSUNG ELECTRONICS CO., LTD., Suwon-si (KR)

(72) Inventors: Junghak Lee, Suwon-si (KR); Jiyu Park, Suwon-si (KR); Yon Jun Shin, Suwon-si (KR); Sang Hoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 18/756,585

(22) Filed: Jun. 27, 2024

(65) Prior Publication Data

US 2025/0232742 A1 Jul. 17, 2025

(30) Foreign Application Priority Data

Jan. 11, 2024 (KR) ........................ 10-2024-0004635

(51) Int. Cl.
*G06F 1/32* (2019.01)
*G09G 5/00* (2006.01)

(52) U.S. Cl.
CPC ......... *G09G 5/003* (2013.01); *G09G 2310/08* (2013.01); *G09G 2330/023* (2013.01); *G09G 2330/026* (2013.01)

(58) Field of Classification Search
None
See application file for complete search history.

(56) References Cited

U.S. PATENT DOCUMENTS

| | | | |
|---|---|---|---|
| 7,388,618 | B2 | 6/2008 | Tardif |
| 10,554,865 | B2 | 2/2020 | Lee et al. |
| 11,706,394 | B1 | 7/2023 | Xie |
| 11,720,204 | B2 | 8/2023 | Bin et al. |
| 11,810,519 | B2 | 11/2023 | Cheon et al. |

(Continued)

FOREIGN PATENT DOCUMENTS

| | | | |
|---|---|---|---|
| JP | 2000-66654 | A | 3/2000 |
| KR | 10-2015-0133085 | A | 11/2015 |

OTHER PUBLICATIONS

Communication issued Jan. 22, 2025 by the European Patent office in European Patent Application No. 24190745.0.

*Primary Examiner* — Krishna P Neupane
(74) *Attorney, Agent, or Firm* — Sughrue Mion, PLLC

(57) ABSTRACT

An application processor is provided. The application processor includes: a phase locked loop circuit (PLL); a sleep control logic circuit configured to control the PLL to enter and exit a sleep mode; a wake-up generation logic circuit configured to provide a wake-up request signal to the sleep control logic circuit to control the PLL to exit the sleep mode based on an early wake-up signal; an always-on video timer circuit configured to output a synchronization signal to a display driving chip in a sleep mode section and generate the early wake-up signal; a display video timer circuit configured to receive the synchronization signal from the always-on video timer and indicate the sleep control logic to provide an idle section; and clock switching logic circuit configured to alternately provide, as an operation clock of the sleep control logic, one of an always-on clock and a word clock.

20 Claims, 10 Drawing Sheets

(56) References Cited

U.S. PATENT DOCUMENTS

| | | | | |
|---|---|---|---|---|
| 2003/0131274 | A1* | 7/2003 | Mizuyabu | G06F 1/3218 713/324 |
| 2014/0198089 | A1* | 7/2014 | Lin | G09G 3/3611 345/212 |
| 2015/0331474 | A1 | 11/2015 | Seo et al. | |
| 2016/0358303 | A1 | 12/2016 | Juliano | |
| 2019/0043415 | A1* | 2/2019 | Sinha | G09G 3/20 |
| 2021/0233501 | A1 | 7/2021 | Chaudhari et al. | |
| 2022/0114957 | A1 | 4/2022 | Lee et al. | |
| 2022/0208145 | A1 | 6/2022 | Glen | |
| 2022/0231829 | A1* | 7/2022 | Park | H03L 7/0802 |
| 2022/0301525 | A1 | 9/2022 | Nidamanuri et al. | |

* cited by examiner

APPLICATION PROCESSOR, ELECTRONIC DEVICE HAVING THE SAME, AND METHOD OF OPERATING THE SAME

CROSS-REFERENCE TO RELATED APPLICATION(S)

This application claims priority to Korean Patent Application No. 10-2024-0004635, filed on Jan. 11, 2024, in the Korean Intellectual Property Office, the disclosure of which is incorporated herein by reference in its entirety.

BACKGROUND

The present disclosure relates to an application processor, an electronic device having the same, and a method of operating the same.

Displays may be driven using low-frequency driving. A dedicated interface and driver for low-frequency driving may be provided, and an appropriate display may be selected according to frequency, resolution, and display type. Applications may send data to the display and control the display using a communication protocol, such as Serial Peripheral Interface (SPI), Inter-to-Integrated Circuit (I2C), Display Serial Interface (DSI), Display Port (DP), and the like. An application may generate and process data to be displayed on the display. For example, content to be displayed may be created using a graphics library or an image processing algorithm. To drive a display at a low frequency, a low-frequency signal appropriate for that frequency may be generated so that pixels of the display are updated and the content is displayed on the screen. Low-frequency signals may be used to update the display and display content. A screen effect may be obtained by setting the display update cycle and method. Power consumption may be reduced while driving displays at low frequencies. When the display is inactive, energy may be saved by switching to a low-power mode. Finally, the application may test and optimize the performance of display controls. By following these operations and considerations, the display of low-frequency operation may be effectively controlled in the application and visual information may be effectively displayed in a variety of applied fields.

SUMMARY

Example embodiments provide an application processor efficiently managing power, an electronic device having the same, and a method of operating the same. According to example embodiments, an application processor includes a phase locked loop circuit (PLL); a sleep control logic circuit configured to control the PLL to enter and exit a sleep mode; a wake-up generation logic circuit configured to provide a wake-up request signal to the sleep control logic circuit to control the PLL to exit the sleep mode based on an early wake-up signal; an always-on video timer circuit configured to output a synchronization signal to a display driving chip in a sleep mode section and generate the early wake-up signal; a display video timer circuit configured to receive the synchronization signal from the always-on video timer and indicate the sleep control logic to provide an idle section; and clock switching logic circuit configured to alternately provide, as an operation clock of the sleep control logic, one of an always-on clock and a word clock. The application processor is configured to enter at least two low-power states in the sleep mode section.

According to example embodiments, a method of operating an application processor includes determining to enter a sleep mode of a phase locked loop circuit (PLL) based on determining no data is currently available to be transmitted; entering the sleep mode of the PLL based on the determining; requesting wake-up of the PLL based on a frame update being required while in the sleep mode of the PLL; exiting the sleep mode of the PLL according to the requesting of the wake-up; performing frame counting in the sleep mode; maintaining the sleep mode based on a frame count value being less than or equal to a first value; entering a first low power state based on the frame count value being greater than the first value; and entering a second low power state based on the frame count value being greater than a second value that is greater than the first value.

According to example embodiments, an electronic device includes a panel; a display driving chip configured to control the panel according to frame data and a synchronization signal; and an application processor configured to: provide the synchronization signal and the frame to the display driving chip; and enter a sleep mode of a phase locked loop circuit (PLL) and at least two additional low-power states based on a low-power mode request from the display driving chip.

According to example embodiments, a method of operating an application processor includes receiving a low-power mode entry request signal from a display driving chip; entering a dynamically variable refresh rate mode according to the low power mode entry request signal; entering a selected low-power state that is selected from among a plurality of low-power states in the dynamically variable refresh rate mode; and exiting the selected low-power state based on a frame update and transmitting a new frame to the display driving chip according to a synchronization signal.

BRIEF DESCRIPTION OF DRAWINGS

The above and other aspects, features, and advantages will be more apparent from the following description of example embodiments, taken in conjunction with the accompanying drawings, in which.

DETAILED DESCRIPTION

Hereinafter, example embodiments will be described. Each example embodiment provided in the following description is not excluded from being associated with one or more features of another example or another example embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

An application processor AP, an electronic device including the same, and method of operation thereof according to example embodiments enable a low-power mode with short transition latency to a data transmission state from an ultra low power state (ULPS) by supporting phase locked loop (PLL) sleep functionality even in a video mode where video timing is managed by the AP. Typically, in PLL sleep mode, the PLL is not operational, and does not generate clock signals. Furthermore, power consumption may be minimized even when the display is not functioning by stopping screen output of the display panel and turning off a backlight while in the ULPS.

The AP, the electronic device, and the method of operation thereof according to example embodiments may further add synchronous signals with a constant video timer to continuously manage video timing even in PLL sleep state (i.e., while in the PLL sleep mode). Logic (e.g., circuitry) may also be added to control the frame start timing considering latency consumed by PLL wake-up and emission intervals of a display drive integrated circuit (DDI). Additionally, decoding may be performed to control entry to incremental low-power states based on the interval of frame updates in video mode. By utilizing PLL sleep functionality in panels supporting a command mode and panels utilizing a video mode, maximum power consumption reduction may be achieved when there is no data transmission. Moreover, frame start progresses may be ensured by considering latency required for PLL wake-up and maintaining video timing through a constant video timer to prevent image data from being delayed.

Example embodiments allow for the use of low-power modes regardless of the operation mode required by DDI by supporting PLL sleep functionality even in video modes where video timing needs to be managed by the AP. Additionally, by adding a low-power mode with shorter power-on latency than ULPS, example embodiments enables power consumption effects without delaying frames.

Figure 1:
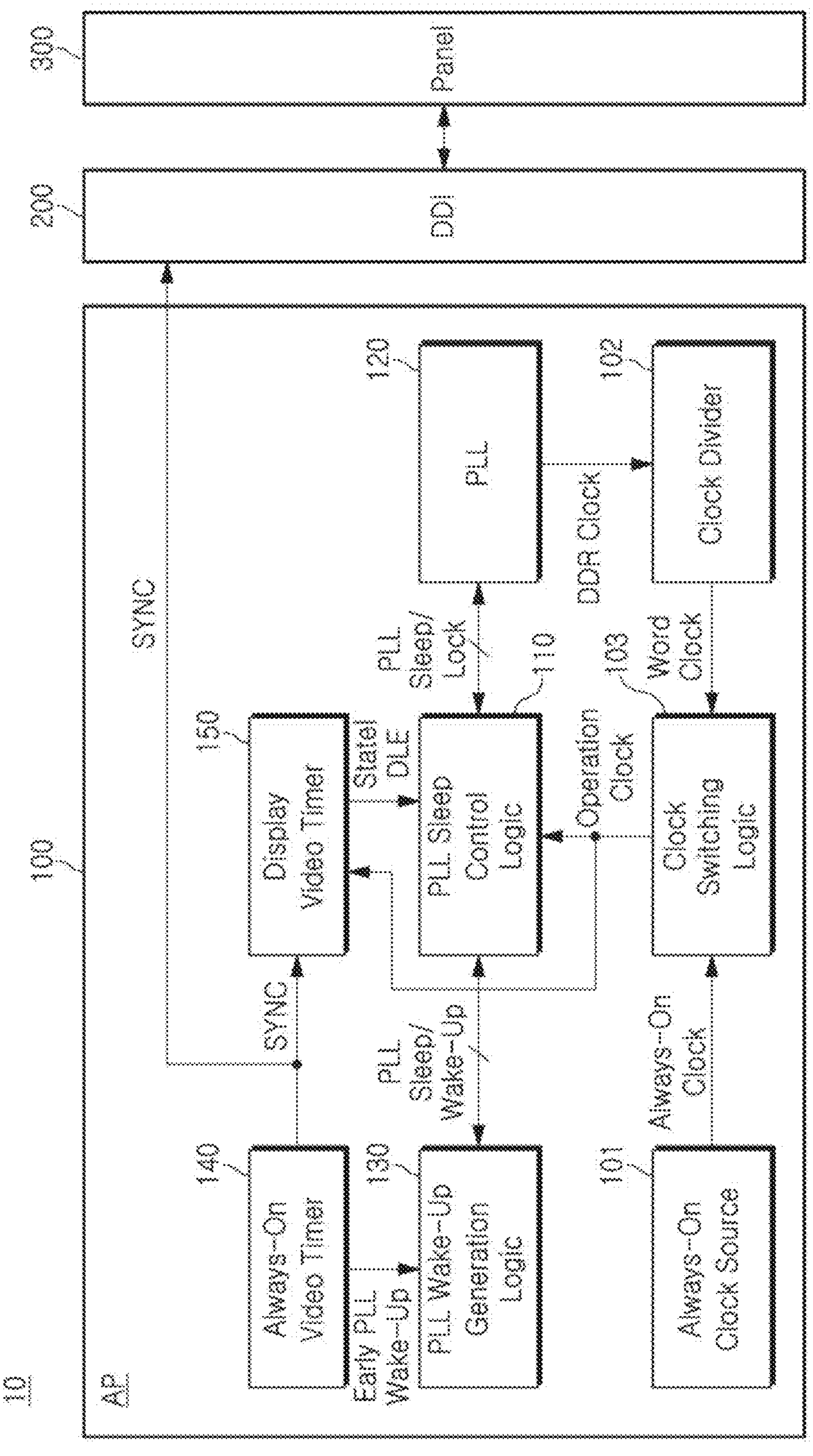
FIG. 1 is a diagram illustrating a display system according to example embodiments.

FIG. 1 is a diagram illustrating a display system 10 according to example embodiments. Referring to FIG. 1, the display system 10 may include an application processor (AP) 100, a DDI 200, and a panel 300.

The AP 100 may include circuitry to implement an always-on clock source 101, a clock divider 102, a clock switching logic 103, a PLL sleep control logic 110, a PLL circuit 120, a PLL wake-up generation logic 130, an always-on video timer 140, and a display video timer 150.

The always-on clock source 101 may be implemented to generate an always-on clock. The clock divider 102 may be implemented to receive a DDR clock and output a word clock based on the DDR clock, for example by distributing the DDR clock. The clock switching logic 103 may be implemented to receive an always-on clock from the always-on clock source 101 and a word clock from the clock divider 102, and to output an operation clock based on the always-on clock and the word clock. The clock switching logic 103 may switch from a word clock with the PLL 120 as a source of the operation clock to an always-on clock as the source of the operation clock, generate a sleep trigger signal based on the change and transmit the generated signal to the PLL 120. When a wake-up request is received, wake-up may be requested to the PLL 120. When PLL wake-up is completed, the clock switching logic 103 may perform an operation to convert output of the operation clock from the always-on clock back to the word clock.

The PLL sleep control logic 110 may be implemented to perform a PLL sleep entry or exit sequence depending on a current state and an input. If the state of the display video timer 150 is IDLE and there are no commands to transmit or other requested operations (skew calibration, BTA, or the like) to be performed, the conditions for sleep entry are established. The PLL sleep control logic 110 may perform a PLL sleep trigger interface operation based on the conditions for sleep entry being established. The PLL sleep trigger interface operation includes providing PLL_Sleep and PLL_LOCK signals. If the PLL_Sleep signal is asserted as Low-to-High, sleep entry has been requested. Conversely, if the PLL sleep signal is de-asserted (i.e., High-to-Low), sleep exit has been requested. The PLL_LOCK signal is a signal supplied from the PLL 120 to the PLL sleep control logic 110. When the PLL 120 is in a stable clock generation state, the PLL_LOCK signal is at high level. When entering sleep state, PLL_LOCK signal is low level.

The PLL wake-up generation logic 130 may be implemented to perform an operation for image data transmission upon receiving an Early PLL wake-up signal from the always-on video timer 140. The AP 100 may perform a preparation operation of reading image data to be transmitted from storage and simultaneously transmitting a PLL wake-up request signal to the PLL sleep control logic 110.

The always-on video timer 140 may be implemented to transmit a synchronization signal to the display video timer 150 and the DDI. A clock source for horizontal synchronization signals may be changed in the PLL sleep state. For example, the clock source may be changed from the always-on clock to the word clock, or from the word clock to the always-on clock. As the clock source changes, the length of the horizontal line counted by the clock may vary. By receiving horizontal synchronization signals at regular intervals from the always-on video timer 140 and performing line counting, vertical video timing may be consistently managed even when the clock source changes. In addition, the wake-up may be completed before the frame update by generating an Early PLL wake-up signal. The Early PLL wake-up signal may be generated earlier than the maximum latency required for wake-up determined by the PLL 120 rather than when the AP 100 actually starts the frame update, thereby preventing image transfer delay.

The AP 100 according to example embodiments may be applied to a DSI host link controller. The AP 100 according to example embodiments may enter various low-power modes in sections without data transmission when using dynamic Variable Refresh Rate (VRR).

The DDI 200 may be implemented to control the operation of panel 300. For example, the DDI 200 may change the data transmitted from the AP 100 into data in a form to be transmitted to the panel 300, and may transmit the changed data to the panel 300. In example embodiments, the DDI 200 may control the state (sleep state, display on state, display off state, and the like) of the panel 300. The DDI 200 may be implemented not to include a frame buffer (for example, graphic random access memory GRAM) that stores frame data received from the AP 100. The DDI 200 may be implemented to display frame data on the panel 300 in response to timing information in a low-frequency operation mode (for example, 1 Hz or 10 Hz operation mode). In this case, the timing information may be received from the AP 100 in low-frequency operation mode.

The panel 300 may be implemented to display image data. In example embodiments, the panel 300 may be implemented as a thin film transistor liquid crystal display (TFTLCD) panel, a light emitting diode (LED) display panel, an organic LED (OLED) display panel, an active matrix OLED (AMOLED) display panel, a flexible display panel, or the like. In detail, the panel 300 may be implemented as a Low Temperature Poly Crystalline Oxide (LTPO) panel. Also, details about the LTPO panel are described in US 2022-0114957, which is incorporated by reference in its entirety. Also, the panel 300 may include a plurality of pixels disposed in a matrix form with a plurality of rows and a plurality of columns. The plurality of pixels may be respectively connected to a plurality of data lines and a plurality of source lines. In this case, the pixel is a structure in which subpixels (e.g., red (R), green (G), and blue subpixels) are disposed to be adjacent to each other in relation to the designated color display, and one pixel may include RGB subpixels (a RGB stripe layout structure) or RGGB subpixels (a Pentile layout structure). In this case, the arrangement structure of RGGB subpixels may be replaced with an RGBG subpixel arrangement structure. Alternatively, the pixels may be replaced with an RGBW subpixel arrangement structure.

Power states presented in the MIPI D-PHY/C-PHY standard are broadly divided into different modes, including High-Speed (HS) transmission mode, Low-Power (LP) mode, and Ultra Low-Power State (ULPS). HS transmission mode is a mode for transmitting data as quickly as possible in a differential manner. LP mode and ULPS mode are states for low power. LP mode operates a wire in a single ended form and toggles only at low frequencies of 20 MHz or lower or maintains the IDLE state without transition. ULPS mode is a mode that focuses more on significantly reducing power consumption than LP mode, and performs the operation of lowering all levels of wires to low on the receiver side.

Figure 2:
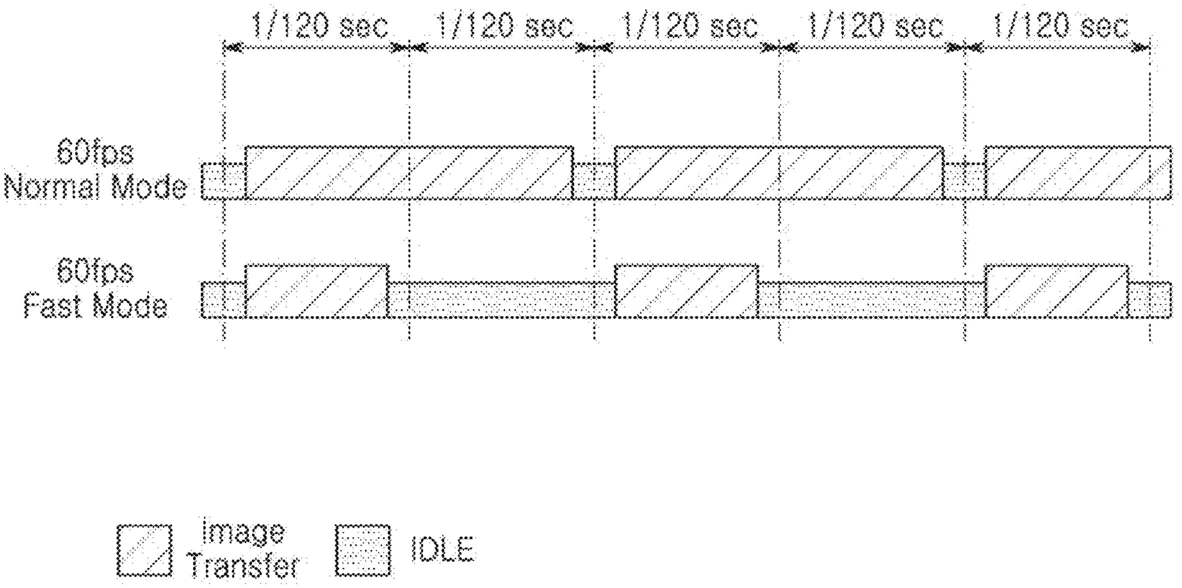
FIG. 2 is a diagram illustrating a low power mode in a related application processor (AP)

FIG. 2 is a diagram illustrating the low power mode in a related AP. In the case of ULPS mode presented in the standard, a minimum of 1 millisecond (ms) is provided as a reference for wake-up only. In actual operation, longer latency is generally required, and thus it may only be used in limited situations. For example, when the frame rate is 60 frames per second (fps), the length of one frame is about 16.6 ms, and thus, transmitting image data within one frame and performing ULPS entry and exit operations in the remaining time are not effective in reducing power. Therefore, related low-power techniques are mainly applied in cases where image updates are not required for several frames and thus display output is not required.

In addition, related low-power techniques use a low power feature for PLL sleep that may reduce power consumption without long wake-up latency. In this case, PLL sleep is a function that turns off the PLL, which is the source of the serial clock used for PHY serial data transmission. This has less power reduction effect than ULPS, but has the advantage of being more effective in power reduction and lower latency than LP mode. Wake-up latency varies depending on the PLL specification. Generally, the wake-up latency of the PLL requires a maximum of 200 microseconds (us) or less. However, it is not appropriate to apply when the porch section of the video mode is short. In video mode, because the AP should check the video timing based on the clock and transmit a horizontal synchronization signal HSync to the DDI, problems may occur due to clock switching due to PLL sleep. For this reason, PLL sleep is only used in command mode of quickly transmitting image data in bursts.

As demand grows for dynamic Variable Refresh Rate (VRR), in which frame rates are adjusted according to the application, video modes capable of supporting VRR in DDI without frame buffers may be used as primary operating modes. Therefore, minimizing power consumption as much as possible in video mode is crucial. The present disclosure provides a solution to this demand.

Typically, the operation of VRR includes Normal Mode and Fast Mode. In Normal Mode, image data is transmitted according to the frame rate, similar to traditional video mode operation. Fast Mode completes the transmission of image data based on the max frame rate, and remains in an IDLE state without data transmission for the remaining time within one frame corresponding to the actual frame rate. Generally, during these IDLE intervals, because there is no data transmission, low-power modes described in the MIPI standard are maintained. Even then, the serial clock source of the PHY, PLL (Phase-Locked Loop), remains on, consuming power continuously. The AP 100 may enter a low-power mode called PLL sleep during these IDLE intervals. In this case, the IDLE interval is relatively longer compared to the porch interval of the video mode. Although the IDLE interval is not long enough for entry to Ultra Low Power State (ULPS), this interval provides sufficient time for PLL sleep entry and exit. Therefore, effectively reducing power consumption by utilizing PLL sleep during this interval is possible.

According to an example embodiment, the AP 100 may utilize a constant video timer (i.e., the always-on video timer) 140 to resolve video timing issues caused by clock switching and support PLL sleep functionality with relatively short wake-up latency in video mode. The AP 100 may support low-power modes step by step depending on the length of the IDLE interval according to the frame rate when operating in video mode.

Figure 3:
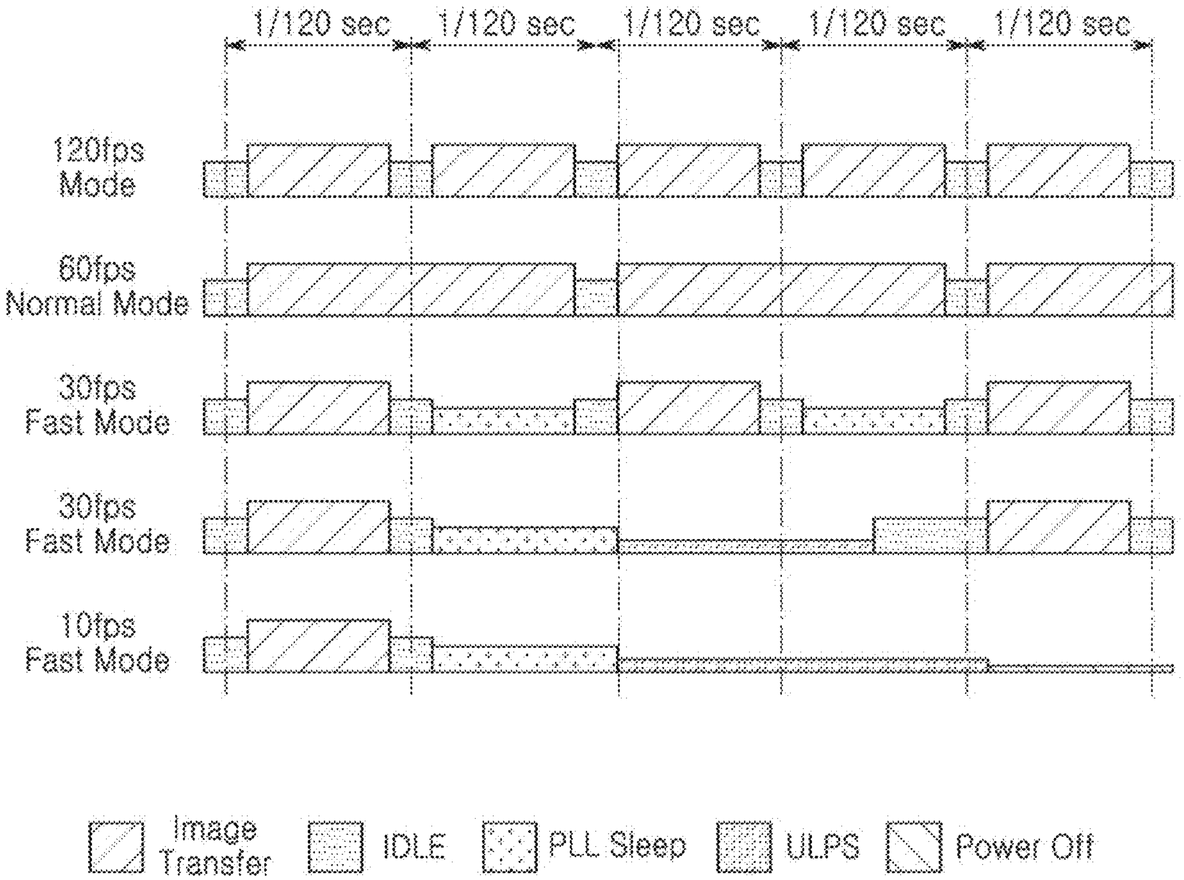
FIG. 3 is a diagram illustrating a step-by-step low power mode of an AP according to example embodiments.

FIG. 3 illustrates stepwise low-power modes of the AP 100 according to an example embodiment. When applying VRR, regardless of the actual frame rate of the panel 300, the bandwidth of image data transmission is fixed based on a maximum frequency of the AP 100, allowing for the fastest possible data transmission. Therefore, applying a low-power method during the remaining time until frame update is feasible. For instance, an AP 100 supporting frame rates up to 120 fps may transmit image data with the bandwidth of 120 fps even when operating at an actual rate of 60 fps. Consequently, when operating at 60 fps, the AP 100 may transmit image data for 1/120th of a second, while remaining idle for the next 1/120th of a second.

The AP 100 enters PLL sleep during this 1/120th of a second through PLL sleep control logic 110 and PLL wake-up occurrence logic 130, effectively reducing power by waking up before a frame update. Furthermore, even with clock switching due to PLL sleep, the interval of synchronization from the AP 100 to DDI 200 may be maintained consistently using a constant video timer 140. When frame update is required, the constant video timer 140 sends an early frame start signal to the PLL wake-up occurrence logic 130 before the frame update, initiating the wake-up sequence (PLL sleep exit sequence) to prevent delays caused by wake-up, thus maintaining responsiveness of frame updates. Additionally, for lower frame rates such as 30 fps, 10 fps, and 1 fps, the AP 100 may enter ULPS or Power off state step by step (i.e., a first step low-power mode, a second step low-power mode and a third step low-power mode), achieving greater power reduction effects.

The low-power technique according to example embodiments may be applied by categorizing low-power modes based on frame update intervals into: PLL sleep mode, ULPS mode with display chain power down, and PHY power off mode. The ULPS mode may consume less power than the PLL sleep mode, and the ULPS mode may consume more power than the PHY power off mode.

In the first step low-power mode, PLL sleep mode, power reduction targets only the serial clock PLL 120. Its entry/exit sequence has the shortest latency and is hardware-controlled. If no image transmission occurs after one frame, the hardware (i.e., the AP 100) autonomously activates PLL sleep functionality when it enters the IDLE state.

In the second step low-power mode, ULPS mode, logic hardware of the AP 100 for processing images for a next display chain is powered down. This requires software intervention and has a longer wake-up latency compared to PLL sleep, thus applied when there are no frame updates for two or more frames.

In the third step low-power mode, PHY power off mode, PHY is powered off when frame update intervals become longer than ULPS mode, maximizing power reduction.

The AP 100 may achieve maximum power reduction effects while considering latency by applying optimized low-power methods according to different situations as described above.

Figure 4:
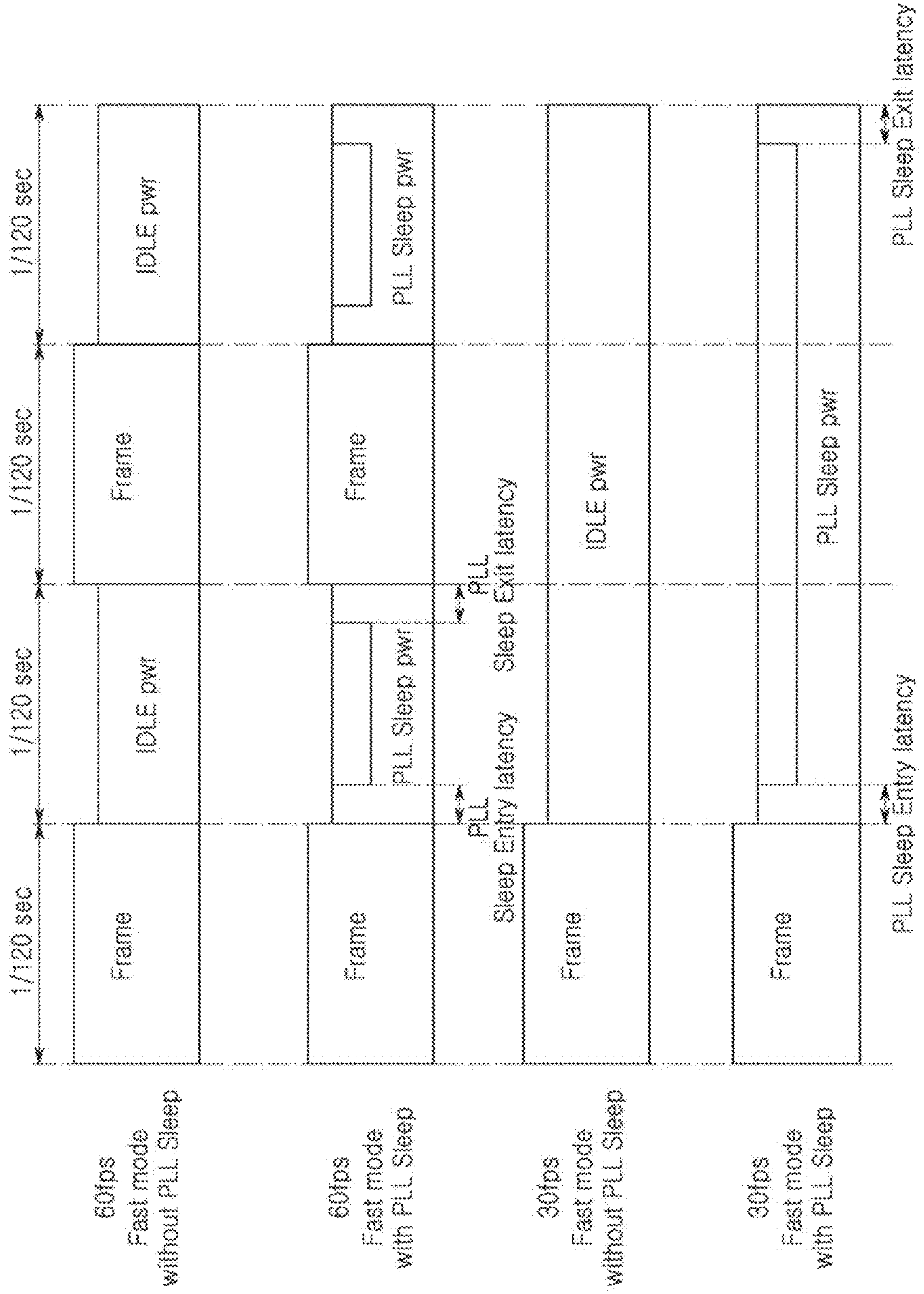
FIG. 4 is a diagram illustrating power evaluation of an AP according to example embodiments.

FIG. 4 is a diagram illustrating power evaluation of the AP 100 according to example embodiments. When the display system 10 is in a low-power state, video timing and frame update responsiveness are maintained. This maintains operational consistency. Unlike other low-power methods, the AP 100 has a PLL sleep feature that allows automatic hardware control without software intervention, and thus there is no side effect such as increased power consumption of other blocks in the AP 100. Therefore, application thereof is possible without considering trade-offs.

Comparing the power reduction effects when using LP mode and PLL sleep in the IDLE section, IDLE power may be reduced by about 40% in the PLL sleep state. When using VRR's fast mode, as the frame rates decrease, the length of the IDLE section in which PLL sleep is possibly becomes longer, resulting in a greater power reduction effect.

As illustrated in FIG. 4, a power reduction before and after PLL sleep is expected. Regardless of the frame rate, in fast mode, data is transmitted at the maximum frequency of 120 fps and the next frame is updated according to the frame rate, and thus power is reduced during the period when data is not transmitted. If comparing the values with the normal mode in which image data is transmitted according to the frame rate without an IDLE section, a much greater power reduction effect is expected.

Figure 5:
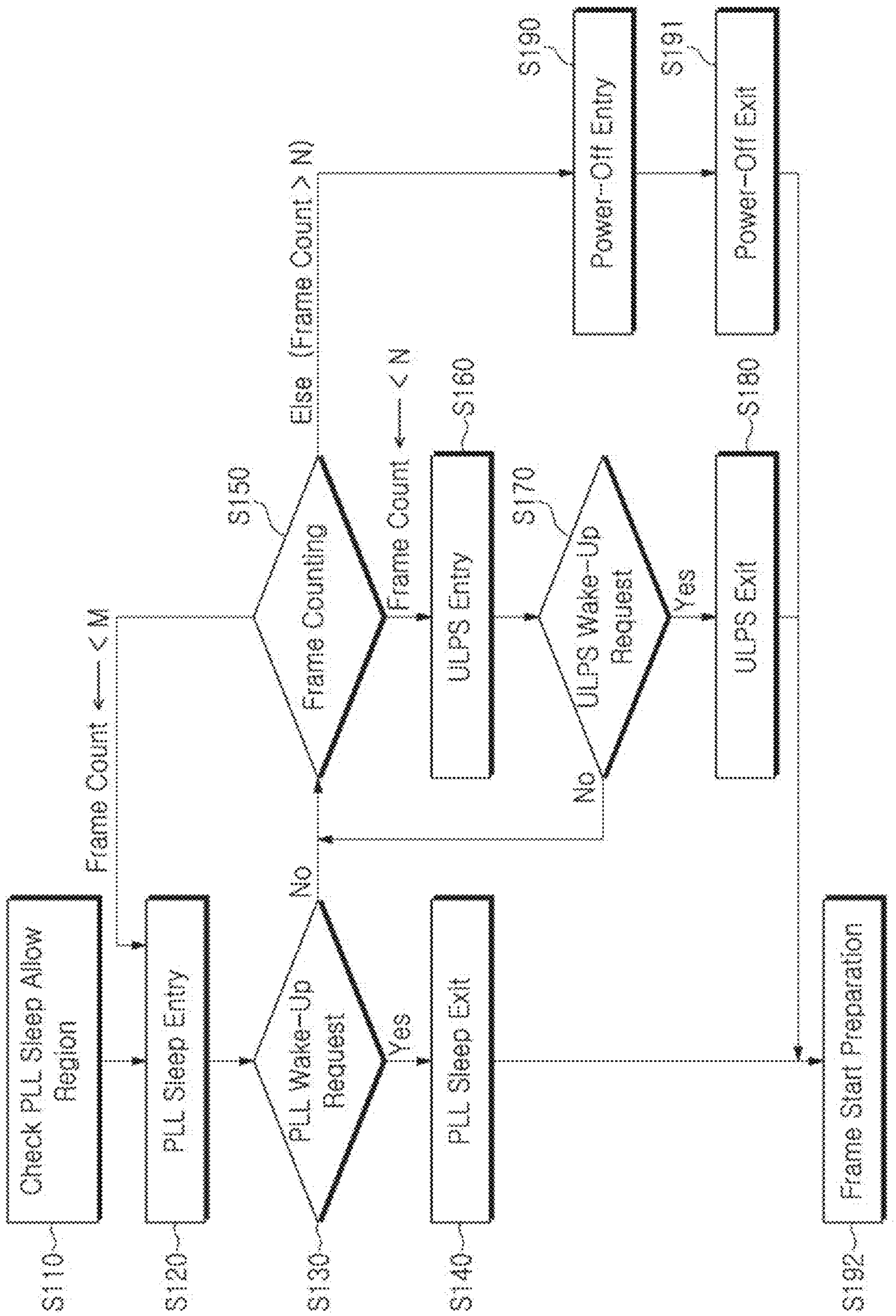
FIG. 5 is a flowchart illustrating the operation of an AP according to example embodiments.

FIG. 5 is a flowchart illustrating operation of the AP 100 according to an example embodiment. Referring to FIGS. 1 through 5, the low-power operation of the AP 100 may proceed as follows:

The AP 100 may determine whether to enter PLL sleep by checking if there is data to be transmitted or if there are no other planned operations (S110). The AP 100 may enter and maintain the PLL sleep state through the PLL sleep entry handshake between the PLL 120 and PLL sleep control logic 110 based on determining there is no data to be transmitted and there are no other planned operations. Prior to PLL sleep, the clock switching logic 103 may switch the operation clock to a constant clock (i.e., may switch the operation clock from the word clock to the always-on clock) so that the display video timer 150 and PLL sleep control logic 110 may operate even in the PLL sleep state (S120).

When a state requiring PLL wake-up, such as when frame update is needed or when a command delivery is required, occurs, the AP 100 may perform PLL sleep exit operation upon receiving PLL wake-up request (S130). If a PLL wake-up request is present, the AP 100 may enter the PLL on state through the PLL sleep exit handshake between the PLL 120 and PLL sleep control logic 110 (S140). Once PLL on is confirmed, the clock switching logic 103 may change the source of the operation clock back to the word clock. However, if there is no PLL wake-up request, the AP 100 may perform a frame counting operation. If there was no PLL wake-up signal during one frame, the AP 100 may increment the frame count value by one (S150).

The application of a specific low-power mode may be determined based on the frame count value reaching certain thresholds. Until the frame count value reaches M, the AP 100 may maintain the PLL sleep state (S120). When the frame count value reaches N, the AP 100 may perform ULPS entry operation (S160). Additionally, if the frame count value exceeds N, the AP 100 may perform Power off entry operation (S190). The expiration values of each counter have a relationship M<N, where M, N are natural numbers determined to optimal values through power simulations specific to each application.

In operation S160, if the frame count value remains higher than M without any data transmission, the AP 100 may enter the ULPS state, which offers relatively significant power reduction effects. Subsequently, it may be determined whether ULPS wake-up operation is required (S170). If ULPS wake-up operation is required, the AP 100 may perform ULPS exit operation (S180). Conversely, if ULPS wake-up operation is not required, frame counting operation (S150) may be performed.

In operation S180, ULPS exit operation may be performed using the protocol specified in the MIPI DSI protocol. In operation S190, if the frame count value remains higher than N without any data transmission, to maximize power reduction effects, the power of display configurations within the AP may be turned off (S191). During Power off exit, the AP 100 may initiate all initialization sequences or, depending on the case, simplify the sequences using retention storage. After all low-power modes have been terminated, the AP 100 may prepare to start a new frame (S192).

Figure 6:
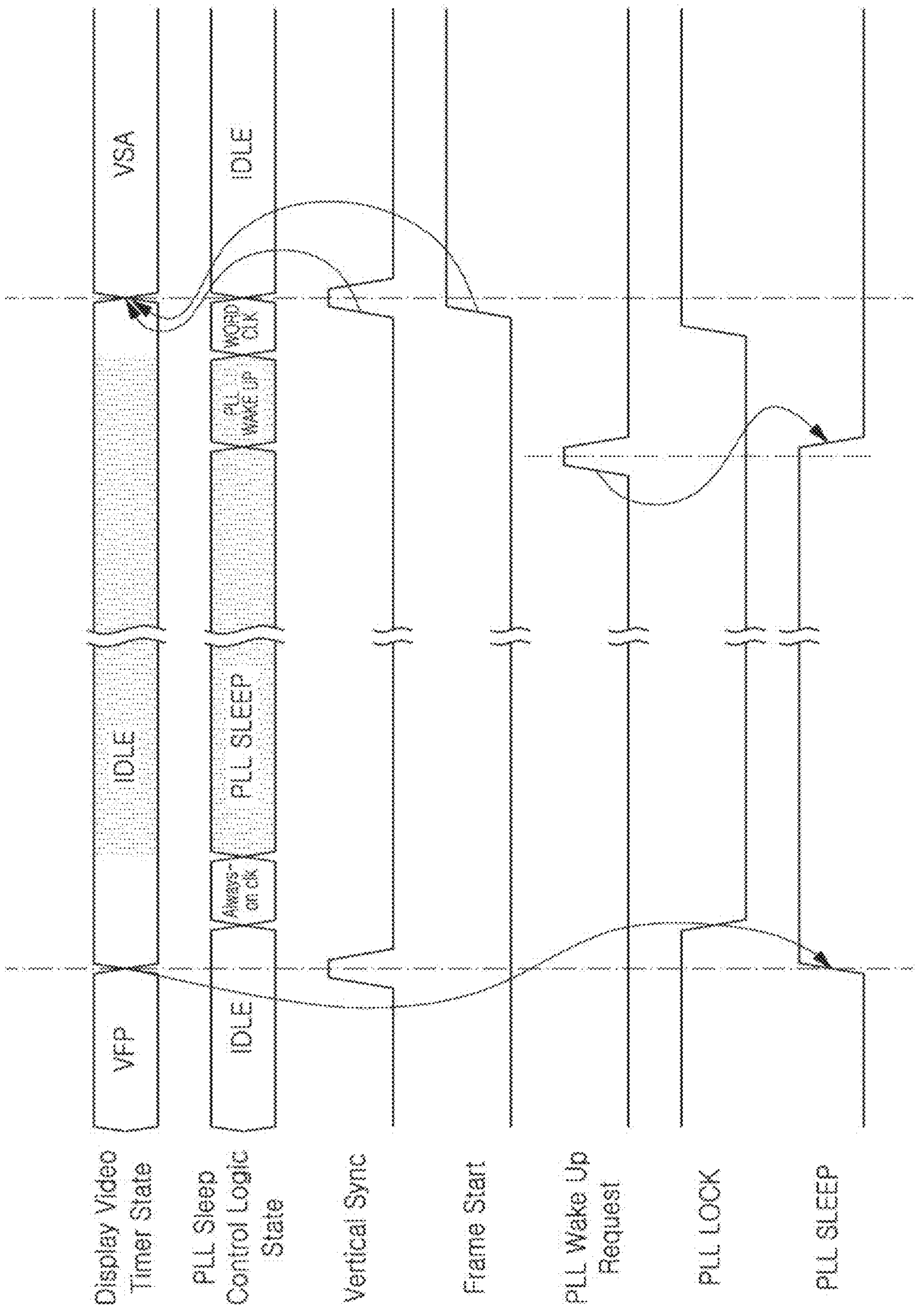
FIG. 6 is a diagram illustrating the timing of state transitions of state machines and related signals when performing a PLL sleep operation in a video mode of an AP according to example embodiments.

FIG. 6 is a diagram illustrating, as an example, state transitions of state machines and the timing of related signals when performing a PLL sleep operation in the video mode of the AP 100 according to example embodiments. In the case in which there is no image data transmission, the display video timer 150 enters the IDLE state. At this time, (i.e., when both the display video timer state and the PLL sleep control logic state are in the IDLE state) the sleep entry condition may be confirmed. As illustrated in FIG. 6, clock switching may proceed with an always-on clock other than the word clock. A PLL sleep signal may be asserted to the PLL 120. When the PLL 120 receives the PLL sleep signal, the PLL notifies that PLL off has been completed, by lowering the lock status signal to low. Afterwards, when image data transmission is requested and a PLL wake-up signal is received, the PLL sleep control logic 110 de-asserts the PLL sleep signal. When the PLL lock status from the PLL 120 rises to high, the sleep exit operation is completed by completing clock switching back to the word clock. Then, when a frame update is required, the frame start is asserted according to a vertical sync signal and next image data may be transmitted.

Figure 7:
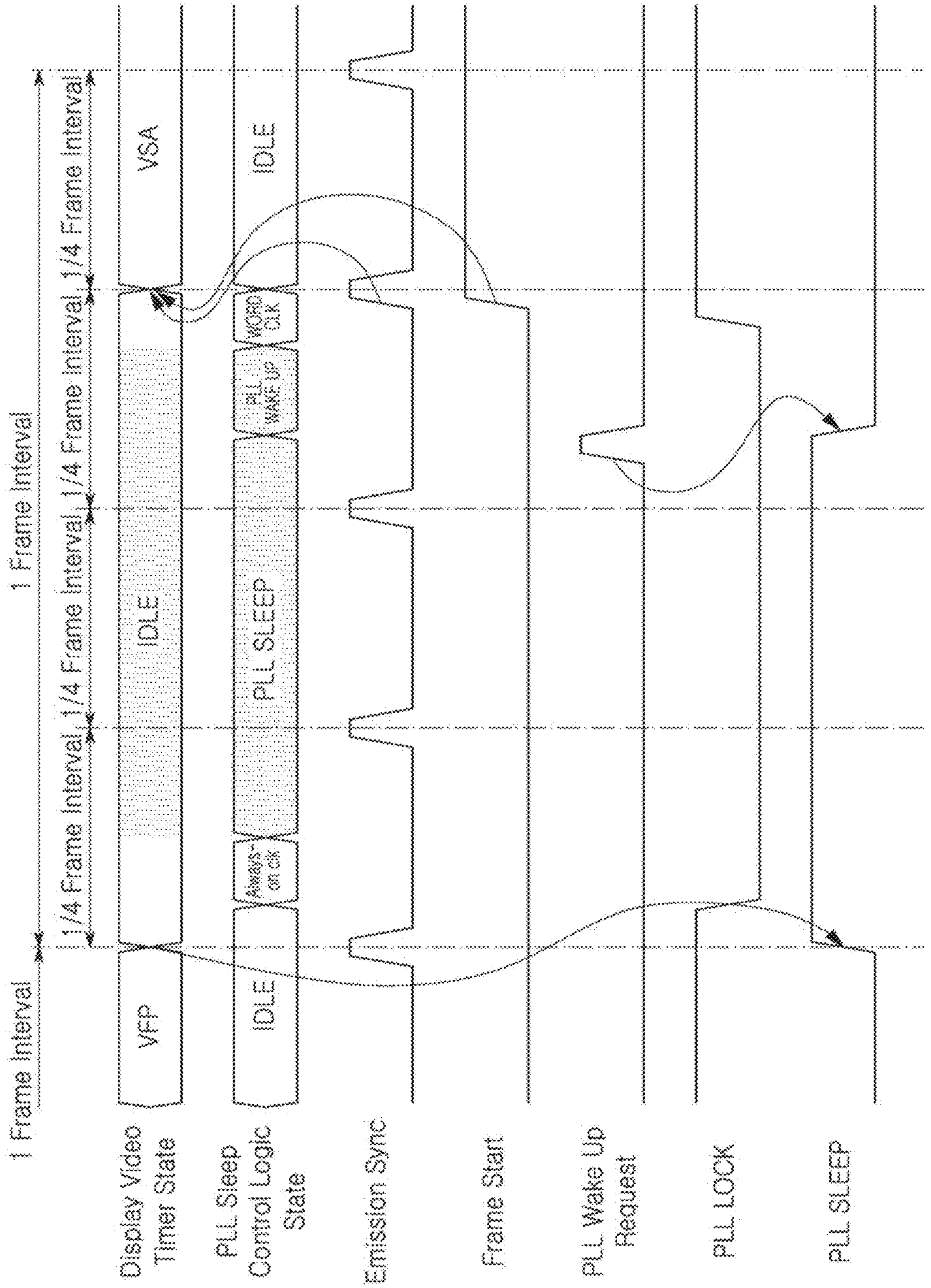
FIG. 7 is a diagram illustrating timing when using a light emission signal in a low power mode of an AP according to example embodiments.

FIG. 7 is a diagram illustrating timing when using a light emission signal in a low power mode of the AP 100 according to example embodiments. As shown, frame updates may be started at 1-frame intervals, for example, according to the vertical synchronization signal. When using the emission synchronization function, the frame may be started at ½ frame point, or ¼ or ¾ frame point. This function is to subdivide the frame start point to increase response speed when image data is not being transmitted in the IDLE state and the frame should be updated in response to input such as the user's touch or motion.

Because the panel's emission cycle should be considered if there is a frame request, the video mode controller may include a counter that manages the emission interval. The video mode PLL sleep and emission synchronization according to example embodiments may be correlated.

If the emission synchronization function is not supported, because the time remaining until the frame update is shorter than the wake-up latency, the frame update is delayed by time of at least one frame in the case in which frame update is possible at the next vertical synchronization timing, and thus, the response speed may be slow. Also, assuming that the emission synchronization function is supported and the interval of emission synchronization is ½ frame, the response time required for frame update may be shortened to ½ frame. The shorter the interval of the emission synchronization signal, the higher the responsiveness will be.

As illustrated in FIG. 7, the case in which the interval of the emission synchronization signal is ¼ frame is provided. From a system perspective, when the emission synchronization function and the PLL sleep function are used together, the low-power effect of example embodiments may be maintained while the side-effect of longer frame update latency may be significantly reduced.

In the case of the PLL sleep function applied to the AP 100 according to example embodiments, the target of power reduction may only be the PLL 120 and some logic of the physical layer with the PLL 120 as a clock source. In another example embodiment, the low-power target may be expanded by applying hardware auto power gating to some blocks of the AP 100 in the PLL sleep state.

Through the protocol analyzer, it is possible to check what power state is maintained for each scenario and measure power according to the scenario.

Because PLL sleep may be automatically controlled by hardware without software intervention, the entry and exit sequences are simpler. Because there are no side effects such as increased power consumption of other blocks within the AP, application thereof may be facilitated without considering trade-offs. Additionally, the combination with the concept of a light emission synchronization signal is possible, and thus, frame update delay may be significantly reduced by wake-up latency.

Figure 8:
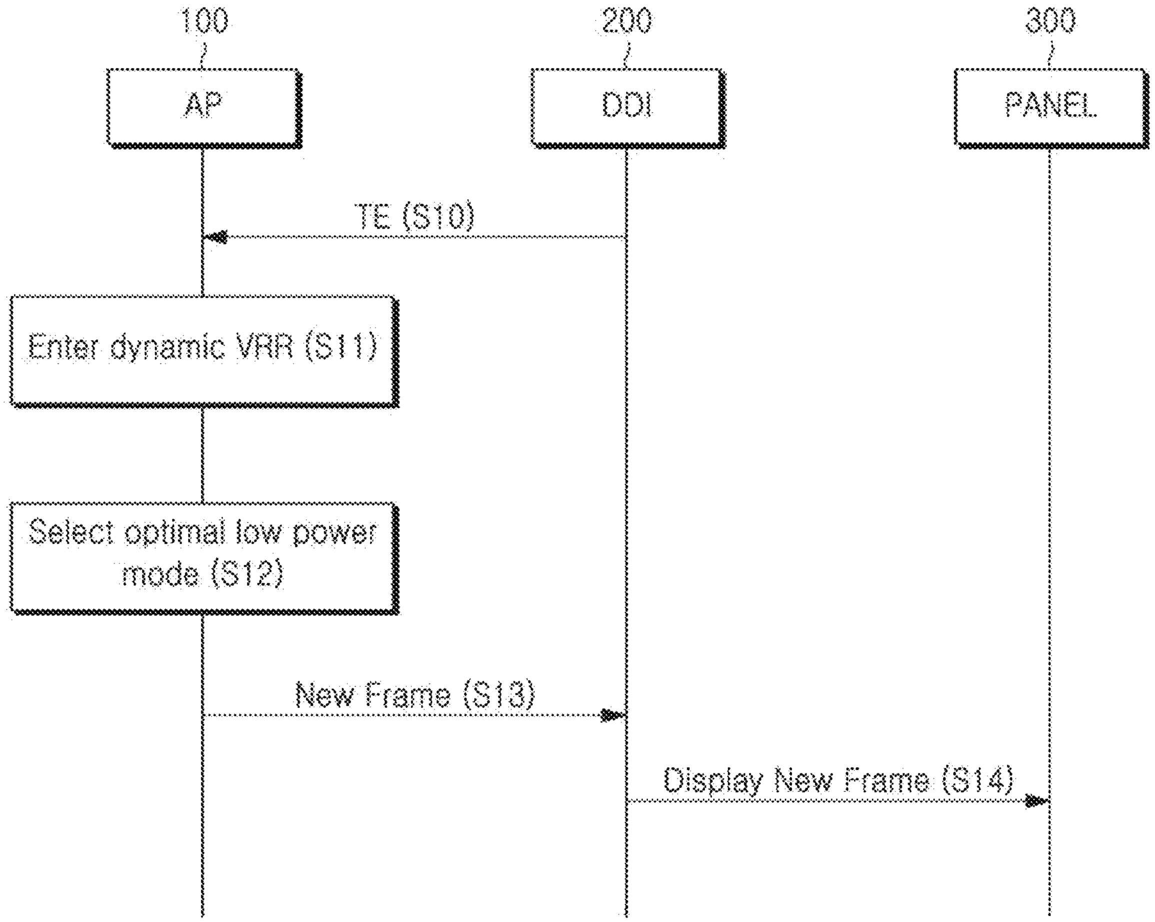
FIG. 8 is a ladder diagram illustrating low-power operation of a display system according to example embodiments.

FIG. 8 is a ladder diagram illustrating low-power operation of the display system 10 according to example embodiments. Referring to FIGS. 1 to 8, the step-by-step low-power operation of the display system 10 may proceed as follows.

DDI may transmit a low-power request to the AP through a Tearing Effect (TE) signal (S10). The AP may enter dynamic Variable Refresh Rates (VRR) in response to this low power request (S11). By performing a dynamic VRR operation as described in FIGS. 1 to 7, an optimal low power mode may be selected according to the situation of the display system (S12). Afterwards, the AP may transmit a new frame to the DDI (S13). The DDI may display a new frame on a panel (S14).

In example embodiments, the DDI does not include a frame buffer, and in a plurality of low-power states, the synchronization signal may be output using an always-on clock rather than a phase locked loop (PLL). In example embodiments, the plurality of low power states may include a sleep state of the PLL. In example embodiments, the PLL may be put to sleep or wake-up in hardware without software intervention. In example embodiments, frame counting may be performed and it may enter one of the plurality of low power states depending on the frame count value.

Also, example embodiments may be implemented in mobile devices.

Figure 9:
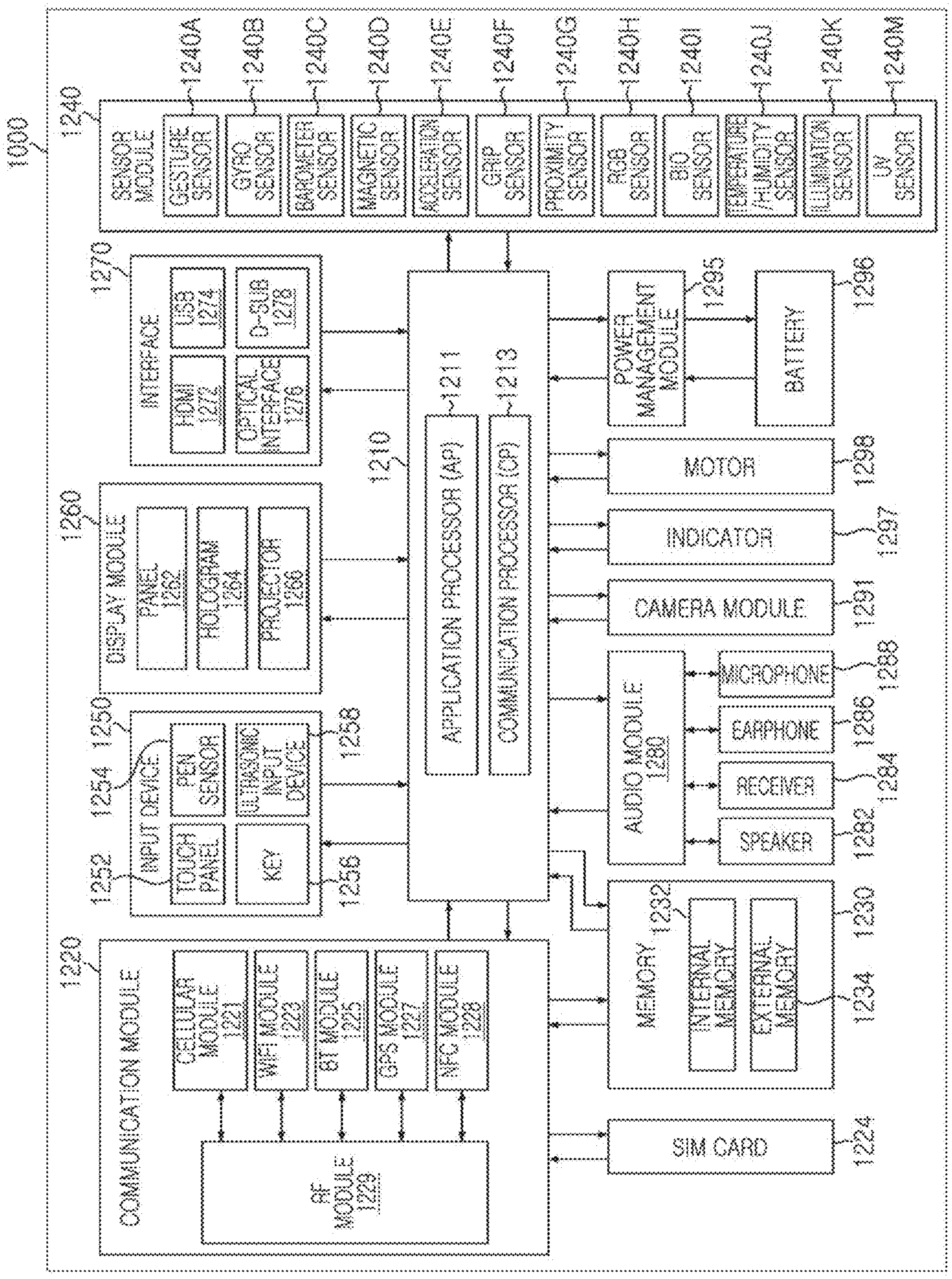
FIG. 9 is a diagram illustrating a mobile device according to example embodiments.

FIG. 9 is a diagram illustrating a mobile device according to example embodiments. Referring to FIG. 9, a mobile device 1000 may include at least one processor 1210, a subscriber identification module (SIM) card 1224, a memory 1230, a communication module 1220, a sensor module 1240, a user input device 1250, a display module 1260, an interface 1270, an audio module 1280, a camera module 1291, a power management module 1295, a battery 1296, an indicator 1297, or a motor 1298.

The processor 1210 may include at least one application processor (AP) 1211 and at least one communication processor (CP) 1213. The AP 1211 and the CP 1213 may respectively be included in different IC packages. In example embodiments, the AP 1211 and the CP 1213 may be included in one IC package.

The AP 1211 runs an operating system/application program to control multiple hardware or software components connected to the AP 1211 and may perform various types of data processing and calculations, including multimedia data. The AP 1211 may be implemented, for example, as a system on chip SoC. In example embodiments, the processor 1210 may further include a graphics processing unit GPU. The CP 1213 may manage data links in communications between electronic devices including the mobile device 1000 and other electronic devices connected by a network and may perform a function of converting communication protocols. The CP 1213 may be implemented, for example, as the SoC. In example embodiments, the CP 1213 may perform at least part of the multimedia control function. The CP 1213 may use, for example, a subscriber identification module (for example, SIM card 1224) to distinguish and authenticate a terminal within a communication network. Additionally, the CP 1213 may provide services such as voice calls, video calls, text messages, packet data, or the like to users. Additionally, the CP 1213 may control data transmission and reception of the communication module 1220. In FIG. 9, although components such as the CP 1213, the power management module 1295, and the memory 1230 are illustrated as separate components from the AP 1211, in example embodiments, the AP 1211 may be implemented to include at least some of the above-described components (for example, CP 1213). In example embodiments, the AP 1211 or CP 1213 may load and process commands or data received from at least one of the non-volatile memory or other components respectively connected thereto, to the volatile memory. Additionally, the AP 1211 or the CP 1213 may store data received from at least one of the other components or generated by at least one of the other components, in a non-volatile memory.

The SIM card 1224 may be a card that implements a subscriber identification module, and may be inserted into a slot formed in a designated location in an electronic device, embedded in the device in the form of a chip, or may be stored as SIM information in part of the device (for example, electronic SIM, virtual SIM, or soft SIM) without a physical form. The SIM card 1224 may include unique identification information (for example, integrated circuit card identifier ICCID) or subscriber information (for example, international mobile subscriber identity IMSI). The SIM card 1224 may operate in conjunction with the communication module 1220.

The memory 1230 may include an internal memory 1232 or an external memory 1234. The internal memory 1232 may include at least one of, for example, a volatile memory (for example, dynamic random access memory DRAM, static RAM SRAM, synchronous dynamic RAM SDRAM, and the like) or a non-volatile memory (for example, one time programmable read only memory OTPROM, a programmable ROM PROM, an erasable and programmable ROM EPROM, an electrically erasable and programmable ROM EEPROM, a mask ROM, a flash ROM, a NAND flash memory, a NOR flash memory, or the like). In example embodiments, the internal memory 1232 may take the form of a solid state drive SSD. The external memory 1234 may further include a flash drive, for example, compact flash CF, secure digital SD, micro secure digital Micro-SD, mini secure digital Mini-SD, or extreme digital xD, memory stick, or the like.

The communication module 1220 may include for example, RF module 1229, cellular module 1221, Wi-Fi module 1223, BT module 1225, GPS module 1226, and NFC module 1228. For example, the communication module 1220 may provide a wireless communication function using radio frequencies. Additionally, the communication module 1220 may include modem or a network interface (for example, LAN card) for connecting the mobile device 1000 to a network (for example, Internet, LAN, WAN, telecommunication network, cellular network, satellite network, POTS, or the like), or the like. The RF module 1229 may be responsible for transmitting and receiving data, for example, RF signals or called electronic signals. The RF module 1229 may include, for example, a transceiver, a power amplification module PAM, a frequency filter, a low noise amplifier LNA, or the like. In addition, the RF module 1229 may further include components for transmitting and receiving electromagnetic waves in free space in wireless communication, for example, include conductors, wires, or the like.

The sensor module 1240 may include at least one of, for example, a gesture sensor 1240A, a gyro sensor 1240B, a barometer sensor 1240C, a magnetic sensor 1240D, an acceleration sensor 1240E, a grip sensor 1240F, a proximity sensor 1240G, an RGB (red, green, blue) sensor 1240H, a bio sensor 1240I, a temperature/humidity sensor 1240J, an illumination sensor 1240K, and an ultra violet UV sensor 1240M. The sensor module 1240 may measure a physical quantity or detect the operating state of an electronic device and convert the measured or detected information into an electrical signal. Additionally, the sensor module 1240 may include, for example, an olfactory sensor (E-nose sensor), an electromyography sensor (EMG sensor), an electroencephalogram sensor (EEG sensor), an electrocardiogram sensor (ECG sensor), a photoplethysmography sensor (PPG sensor), a heart rate monitor HRM sensor, a sweat measurement sensor (perspiration), a fingerprint sensor, or the like. The sensor module 1240 may further include a control circuit for controlling at least one sensor included therein.

The user input device 1250 may include a touch panel 1252, a (digital) pen sensor 1254, a key 1256, and an ultrasonic input device 258. The touch panel 1252 may recognize a touch input using at least one of, for example, capacitive, resistive, infrared, or ultrasonic methods. Additionally, the touch panel 1252 may further include a controller. In the case of capacitive type, not only direct touch but also proximity recognition is possible. The touch panel 1252 may further include a tactile layer. In this case, the touch panel 1252 may provide a tactile response to the user. For example, the pen sensor 1254 may be implemented using the same or similar method for receiving a user's touch input or using a separate recognition sheet. As the key 1256, for example, a keypad or touch key may be used. The ultrasonic input device 1258 is a device that may confirm data by detecting sound waves from a terminal to a microphone (for example, microphone 1288) through a pen that generates ultrasonic signals, and is capable of wireless recognition. In example embodiments, the mobile device 1000 may receive user input from an external device (for example, a network, computer, or server) connected to the communication module, using the communication module 1220.

The display module 1260 may include a panel 1262, a hologram 1264 or projector 1266. The panel 1262 may be, for example, a liquid-crystal display LCD, an active-matrix organic light-emitting diode AM-OLED, or the like. The panel 1262 may be implemented as flexible, transparent, or wearable, for example. The panel 1262 may be composed of the touch panel 1252 and one module. The hologram 1264 may display a three-dimensional image in the air using light interference. In example embodiments, the display module 1260 may further include a control circuit for controlling the panel 1262 or the hologram 1264.

The interface 1270 may include, for example, HDMI 1272, USB 1274, an optical interface 1276, and D-subminiature (D-sub) 1218. Additionally, the interface 1270 may include, for example, a multi-media card (SD/MMC) or an infra-red data association (IrDA). The audio module 1280 may bidirectionally convert voice and electrical signals. The audio module 1280 may convert voice information input or output through, for example, a speaker 1282, a receiver 1284, an earphone 1286, or a microphone 1288. The camera module 1291 is a device that may capture images and videos, and in example embodiments, may include at least one image sensor (for example, a front lens or a rear lens), an image signal processor ISP, or a flash LED.

The power management module 1295 may manage the power of the mobile device 1000. The power management module 1295 may include, for example, a power management integrated circuit PMIC, a charger integrated circuit IC, or a battery fuel gauge. The PMIC may be mounted, for example, within an integrated circuit or SoC semiconductor. Charging methods may be divided into wired and wireless. The charging IC may charge the battery and prevent overvoltage or overcurrent from flowing in from the charger. In example embodiments, the charging IC may include a charging IC for at least one of a wired charging method or a wireless charging method. Wireless charging methods include, for example, magnetic resonance, magnetic induction, electromagnetic wave methods, or the like, and additional circuits for wireless charging, such as coil loops, resonance circuits, and rectifiers, may be added. The battery gauge may, for example, measure the remaining amount of the battery 1296, voltage, current, or temperature during charging. The battery 1296 may generate electricity to supply power and may be, for example, a rechargeable battery. The indicator 1297 may display a designated state of the mobile device 1000 or a part thereof (for example, AP 1211), for example, a booting state, a message state, or a charging state. For example, booting state, message state, or charging state may be displayed. The motor 1298 may convert electrical signals into mechanical vibrations. The mobile device 1000 may include a processing unit (for example, GPU) to support mobile TV. The processing device for supporting mobile TV may process media data according to standards such as, for example, digital multimedia broadcasting DMB, digital video broadcasting DVB, or media flow.

Each of the above-described components of hardware according to various example embodiments may be composed of one or more components, and the names of the components may vary depending on the type of electronic device. Hardware according to various example embodiments may be configured to include at least one of the above-described components, and some components may be omitted or other additional components may be included. In addition, some of the hardware components according to various example embodiments are combined to form a single entity, so that the functions of the corresponding components before being combined may be performed in the same manner.

Also, example embodiments may be implemented in electronic devices having a display system.

Figure 10:
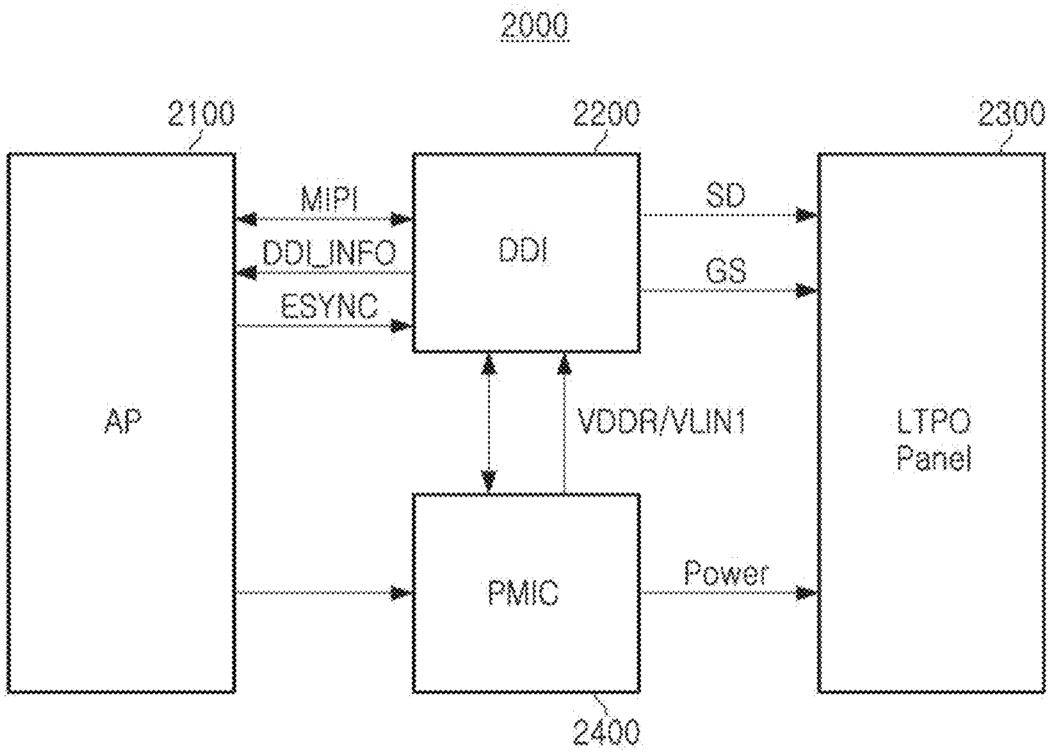
FIG. 10 is a diagram illustrating an electronic device according to example embodiments.

FIG. 10 is a diagram illustrating an electronic device 2000 according to example embodiments. Referring to FIG. 10, the electronic device 2000 may include a AP 2100, a DDI 2200, a panel 2300, and PMIC 2400.

The AP 2100 may be implemented to control the overall operation of the electronic device. In some example embodiments, the AP 2100 may be implemented as an integrated circuit, a system-on-chip, or a mobile application processor. The AP 2100 may transmit data to be displayed (for example, image data, video data, or still image data) to the DDI 2200. In example embodiments, data may be divided into source data SD units corresponding to horizontal lines (or vertical lines) of the display panel 2300. The processor 2110 may be implemented to perform a low-power state change step by step as described in FIGS. 1 to 8.

The DDI 2200 may change data transmitted from the AP 2100 into a form that may be transmitted to the display panel 2300 and transmit the changed data to the display panel 2300. Source data SD may be supplied in pixel units. A first sub-channel signal DDI_INFO may be transmitted to the AP connected according to the judgment of the display driving chip. The first sub-channel signal DDI_INFO may be output to the AP using a Tearing Effect (TE) pin. A second sub-channel signal ESYNC may be the video timing of the display driving chip. The second sub-channel signal ESYNC may be periodically transmitted to the DDI. Additionally, a modulation function may be applied to the second sub-channel signal ESYNC for failsafe. In example embodiments, the second sub-channel signal ESYNC may be output from the AP using an error detection flag pin.

Additionally, the DDI 2200 may control the level of the logic voltage (VDDR)/analog voltage (VLIN1) by communicating with the PMIC 2400. The processor interface may interface signals or data exchanged between the AP 2100 and the DDI 2200. The processor interface may interface source data (SD, line data) transmitted from the AP 2100 and transmit the data to the DDI 2200. In example embodiments, the processor interface may be an interface related to a serial interface such as a Mobile Industry Processor Interface MIPI, a Mobile Display Digital Interface MDDI, a Display Port, an Embedded Display Port eDP, or the like. Additionally, the display panel 2300 may be implemented to display source data SD by the DDI 2200 in response to the gating signal GS. In example embodiments, the display panel 2300 may be a Low Temperature Poly Crystalline Oxide LTPO panel.

The PMIC 2400 may be implemented to manage power of the display device. In example embodiments, the PMIC 2400 may include a charger IC, or a battery or fuel gauge. Additionally, the PMIC 2400 may have a wired and/or wireless charging method. Wireless charging methods include, for example, magnetic resonance, magnetic induction, electromagnetic wave methods, or the like, and may further include additional circuits for wireless charging, such as coil loops, resonance circuits, rectifiers, or the like.

Additionally, the PMIC 2400 may receive commands from the AP 2100 and supply power to respective parts of the display device. The PMIC 2400 may supply power to the DDI 2200 and the display panel 2300, respectively. For example, the PMIC 2400 may provide an external voltage to the DDI 2200. In this case, the external voltage may be processed and used inside the DDI 2200. The power interface may interface between the PMIC 2400 and the DDI 2200. For example, the power interface may transmit commands transmitted to the PMIC 2400 by the DDI 2200. The power interface may be provided separately from the processor interface. The DDI 2200 may be directly connected to the PMIC 2400 without going through the AP 2100.

Additionally, the PMIC 2400 may receive a power setting command from the DDI 2200 to control the level of power VDDR/VLIN1 in each part of the display device.

The device described above may be implemented with hardware components. For example, the devices and components described herein may be implemented by using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers such as any other device capable of executing and responding to instructions. The processing device may execute an operating system (OS) and one or more software applications running on the operating system. Additionally, a processing device may access, store, manipulate, process, and generate data in response to the execution of software. For convenience of understanding, there are cases in which one processing device is described as being used, but those skilled in the art will understand that the processing device may include a plurality of processing elements or multiple types of processing elements. For example, a processing device may include a plurality of processors or one processor and one controller. Additionally, other processing configurations, such as parallel processors, are also possible.

Software may include computer programs, code, instructions, or a combination of one or more thereof, and may configure the processing unit to operate as desired or command the processing units independently or collectively. Software and/or data may be embodied in any type of machine, component, physical device, virtual equipment, computer storage medium or device, to be interpreted by the processing device or to provide instructions or data to the processing device. Software may be distributed over networked computer systems and stored or executed in a distributed manner. Software and data may be stored on one or more computer-readable recording media.

The low-power technique of example embodiments supports the PLL sleep function even in video mode where video timing is managed by the AP, thereby applying the low power scheme regardless of the operation mode (video mode or command mode) required by DDI. The low-power technique of example embodiments adds a low power mode with a shorter power-on latency than ULPS, thereby obtaining a power consumption effect for each frame, but there is no delay in frame update, and thus there is no effect on the display output on the panel. In example embodiments, video timing within the low power mode section may be guaranteed.

When operating in video mode, the AP manages video timing, and thus horizontal sync packets should be transmitted to DDI every horizontal sync interval (*). Horizontal sync interval is approximately several μs, and the length of the PLL sleep section varies depending on the application, but is several ms (Horizontal sync interval(*): 1 (sec)/fps (Hz)/vertical resolution (integer)). In the PLL sleep section, because the PLL clock used in the display interface is not supplied, the data path is not available, and thus horizontal sync packets cannot be transmitted. The always-on video timer is a video timer that uses a clock source independent of the PLL used in the display interface. The component may transmit sync information to the DDI by transmitting the horizontal sync signal to the sideband rather than the display interface, ensuring video timing even in the low power section.

In example embodiments, frame zero-delay due to low power mode is guaranteed. If PLL wake-up is required for image transfer, the always-on video timer generates an early wake-up signal earlier than the latency required for PLL wake-up. Image transfer is determined to be required, and the PLL wake-up latency is shorter than the time to read image data from memory, thereby ensuring that image transfer is not delayed.

In example embodiments, Hardware Self-control is performed. All trigger operations that put the PLL to sleep and wake-up may be performed by hardware self-control without software intervention, and thus there is no need for additional CPU power consumption.

According to example embodiments, a method of operating step-by-step low power mode in VRR is provided. The display system according to example embodiments includes a device for ensuring video timing while obtaining low power effects. The display system according to example embodiments includes a device to prevent frame delay while obtaining low power consumption. The display system according to example embodiments includes a device that controls entry and exit of low power mode by hardware without software intervention.

As set forth above, an application processor, an electronic device having the same, and a method of operating the same according to example embodiments may manage a low-power mode more efficiently by supporting a PLL sleep mode.

In an application processor, an electronic device having the same, and a method of operating the same according to example embodiments, a power reduction effect may be significantly increased when there is no data transmission by a PLL sleep function.

In an application processor, an electronic device having the same, and a method of operating the same according to example embodiments, frame start may proceed in consideration of latency required for PLL wake-up.

In an application processor, an electronic device having the same, and a method of operating the same according to example embodiments, maintenance of video timing may be ensured using an always-on video timer without delay of image data.

While example embodiments have been illustrated and described above, it will be apparent to those skilled in the art that modifications and variations could be made without departing from the scope of the present inventive concept as defined by the appended claims.

What is claimed is:

1. An application processor comprising:

a phase locked loop circuit (PLL);

a sleep control logic circuit configured to control the PLL to enter and exit a sleep mode;

a wake-up generation logic circuit configured to provide a wake-up request signal to the sleep control logic circuit to control the PLL to exit the sleep mode based on an early wake-up signal;

an always-on video timer circuit configured to output a synchronization signal to a display driving chip a plurality of times in a sleep mode section of a frame interval and generate the early wake-up signal;

a display video timer circuit configured to receive the synchronization signal from the always-on video timer circuit and indicate the sleep control logic circuit to provide an idle section; and clock switching logic circuit configured to alternately provide, as an operation clock of the sleep control logic circuit, one of an always-on clock and a word clock, wherein the application processor is configured to enter at least two low-power states in the sleep mode section.

2. The application processor of claim 1, further comprising:

an always-on clock source circuit configured to generate the always-on clock; and a clock divider circuit configured to generate the word clock based on a clock of the PLL.

3. The application processor of claim 1, further comprising a logic circuit configured to control a frame timing based on latency corresponding to wake-up of the PLL and an interval between light emission periods.

4. The application processor of claim 1, further comprising a decoding logic circuit configured to control the application processor to enter the at least two low-power states according to a frame update interval in a video mode.

5. The application processor of claim 4, wherein the at least two low-power states comprises a PLL sleep state, an Ultra Low Power State (ULPS), and a power-off state, and wherein the decoding logic circuit is further configured to control the application processor to enter the PLL sleep state, the Ultra Low Power State (ULPS), and the power-off state in stages according to the frame update interval.

6. The application processor of claim 1, wherein the clock switching logic circuit is further configured to provide the always-on clock to the operation clock in the sleep mode section.

7. The application processor of claim 1, wherein the clock switching logic circuit is further configured to provide the word clock to the operation clock after wake-up of the PLL is completed.

8. The application processor of claim 1, wherein the always-on video timer circuit is further configured to manage a horizontal video timing by line-counting a horizontal synchronization signal at regular intervals.

9. The application processor of claim 1, wherein the clock switching logic circuit is further configured to provide the always-on clock as the operation clock in the idle section.

10. The application processor of claim 1, wherein the PLL is configured to operate in a low power mode managed based on an emission synchronization signal of a panel and a sleep function of the PLL.

11. A method of operating an application processor, comprising:

determining to enter a sleep mode of a phase locked loop circuit (PLL) based on determining no data is currently available to be transmitted;

entering the sleep mode of the PLL within a frame interval, based on the determining;

providing a synchronization signal to a display driving chip a plurality of times in a sleep mode section of the frame interval;

requesting wake-up of the PLL based on a frame update being required while in the sleep mode of the PLL;

exiting the sleep mode of the PLL within the frame interval according to the requesting of the wake-up being received within the frame interval;

performing frame counting in the sleep mode;

maintaining the sleep mode based on a frame count value being less than or equal to a first value;

entering a first low power state based on the frame count value being greater than the first value; and entering a second low power state based on the frame count value being greater than a second value that is greater than the first value.

12. The method of claim 11, further comprising:

exiting the first low power state based on a frame update being requested in the first low power state; and exiting the second low power state based on a frame update being requested in the second low power state.

13. The method of claim 11, wherein the first low power state is an Ultra Low Power State (ULPS), and wherein the second low power state is a power off state.

14. The method of claim 11, further comprising using an always-on clock as an operation clock in the sleep mode section of the frame interval.

15. The method of claim 11, further comprising outputting the synchronization signal the plurality of times from an always-on clock video timer to the display driving chip in the sleep mode section of the frame interval.

16. An electronic device comprising:

a panel;

a display driving chip configured to control the panel according to frame data and a synchronization signal; and an application processor configured to:

provide the synchronization signal and the frame data to the display driving chip; and enter a sleep mode of a phase locked loop circuit (PLL) and at least two additional low-power states based on a low-power mode request from the display driving chip, wherein the application processor is further configured to provide the synchronization signal a plurality of times in a frame interval while the PLL is in the sleep mode.

17. The electronic device of claim 16, wherein the application processor comprises an always-on clock source configured to generate an always-on clock, and wherein the application processor is further configured to use the always-on clock as an operation clock while in the sleep mode of the PLL.

18. The electronic device of claim 16, wherein the application processor comprises:

a sleep control logic circuit configured to control the PLL to enter according to a sleep request and exit the sleep mode according a wake-up request; and a wake-up generation logic circuit configured to generate the wake-up request based on the frame data being updated.

19. The electronic device of claim 18, wherein the application processor further comprises:

an always-on video timer circuit configured to generate an early wake-up request signal based on the frame data being updated and generate the synchronization signal; and a display video timer circuit configured to receive the synchronization signal and indicate an idle section.

20. The electronic device of claim 19, wherein the wake-up generation logic circuit is further configured to output a wake-up request signal according to the early wake-up request signal.

* * * * *